(No Model.)
2 Sheets—Sheet 1.
J. K. O'NEIL.
Mop Wringer.
No. 236,246. Patented Jan. 4, 1881.
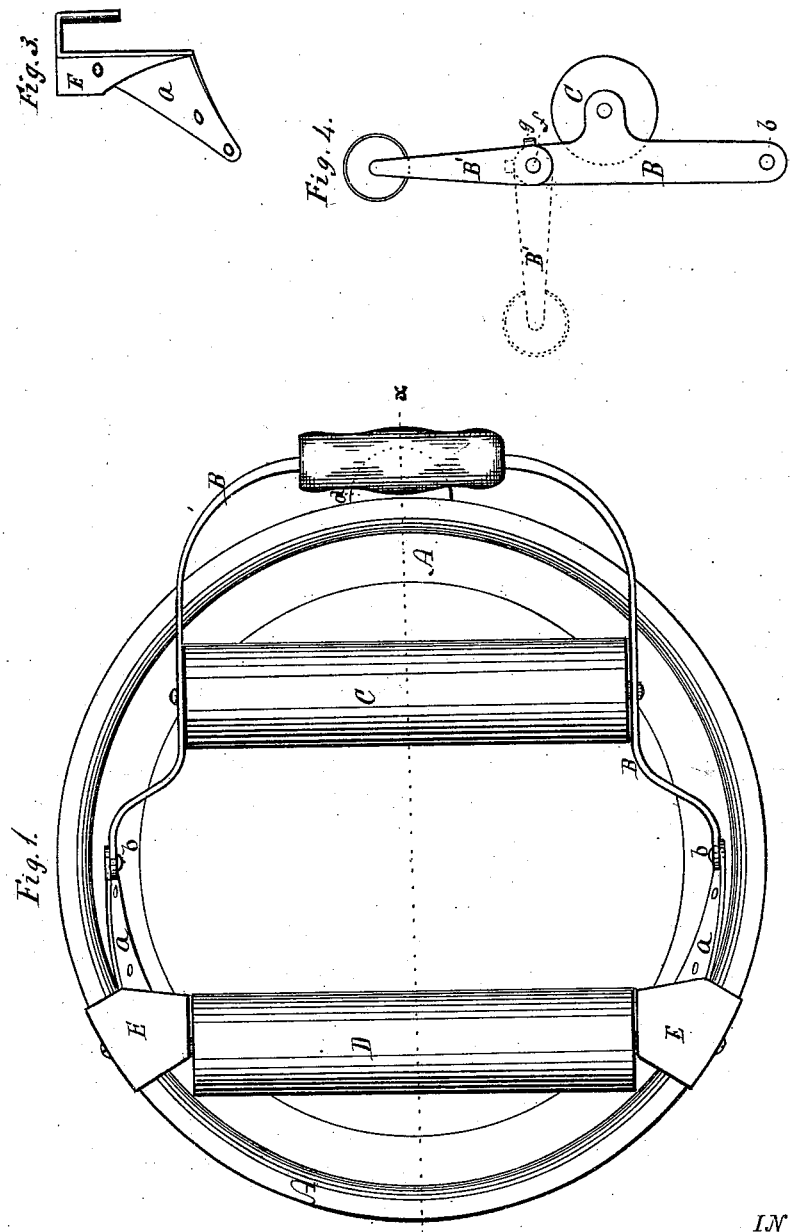
WITNESSES,
INVENTOR,
John K. O'Neil.
By his Attorney,

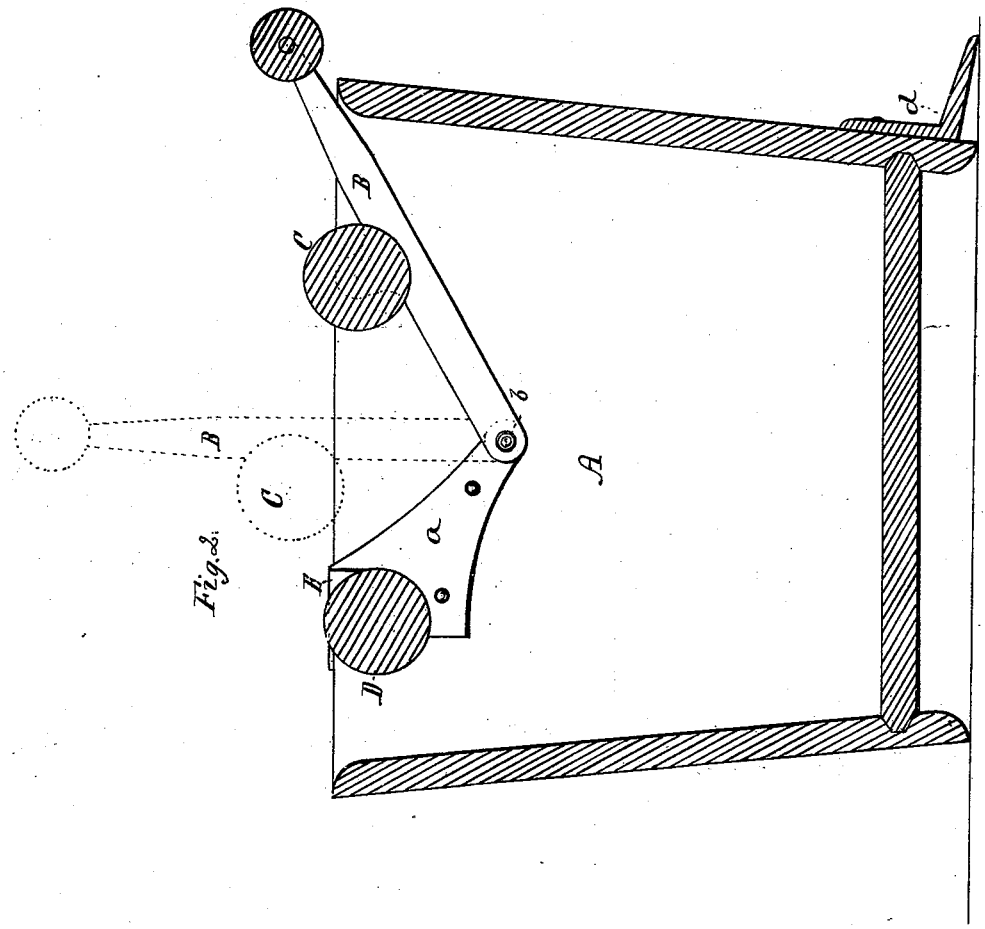

United States Patent Office.

JOHN K. O'NEIL, OF TROY, ASSIGNOR OF ONE-HALF TO HILAND CARPENTER, OF NORTH HOOSICK, NEW YORK.

MOP-WRINGER.

SPECIFICATION forming part of Letters Patent No. 236,246, dated January 4, 1881.

Application filed October 16, 1880. (No model.)

*To all whom it may concern:*

Be it known that I, JOHN K. O'NEIL, of Troy, in the county of Rensselaer and State of New York, have invented an Improved Mop-Wringer; and I do hereby declare that the following is a full and exact description thereof, reference being had to the accompanying drawings, making part of this specification.

Figure 1 is a top view of my improved mop-wringer as applied to a pail, bucket, or tub; Fig. 2, a central vertical section thereof in a plane indicated by the line $x\,x$, Fig. 1; Fig. 3, view of a part detached; Fig. 4, view of a modification of one of the parts.

Like letters designate corresponding parts in all of the figures.

Let A represent a pail, bucket, or tub, to which the wringer is attached, and B the bail by which the same is lifted and carried.

Various ways of applying wringing or mop-squeezing rollers to pails, buckets, and tubs have been devised, some of which embrace the use of the bail thereof as a lever by which to apply the pressure to the rollers; but previous to my invention the bail has had levers, lever-extensions, or arms connected therewith, whereby to operate the movable roller.

By my invention I mount the movable roller in the bail itself, and it is carried and moved directly therewith, thereby occupying no additional room, and rendering the whole apparatus as compact and portable as a simple pail, bucket, or tub, while the whole is reduced to the utmost simplicity and cheapness, and the use of the same is rendered perfectly convenient and effectual.

The bail B, for the purpose of my invention, is preferably pivoted to the pail, bucket, or tub A, on the inside of the same, as at $b\,b$, so as to better enable the apparatus to be made compact and the construction more simple. I find it also convenient and desirable to employ ears $a\,a$, of substantially the form shown in Figs. 1 and 2, and especially in Fig. 3, which represents a view of one of the ears separately, so that the main part thereof may be attached to the inside of the pail, bucket, or tub to receive the bail inside, but so that another part of the same may hook over the edge and outside of the pail, bucket, or tub, as shown. I also find it convenient and economical to employ the same ears to pivot the stationary roller D in, as represented. Besides, I form guards E E, preferably on the same ears, to cover the ends of the stationary roller, and prevent the mop-cloths from getting tangled or caught around the ends of the said roller. These ears may be made of malleable iron or other metal, in any convenient way.

The movable roller C, I mount within the bail proper, so as to move therewith, being located in the position shown, or thereabout. It is best, but not essential, to mount the roller in lateral curves or offsets of the bail, as indicated, so that when the roller is brought near the stationary roller the bail shall not be in the way of the mop or mop-handle. The position of this roller within the bail renders the apparatus as compact as possible, both rollers always being over the mouth of the pail, bucket, or tub, and when the movable bail is swung down into a position of support, as shown in Fig. 1, and by full lines in Fig. 2, it is near one side of the vessel and does not interfere with the dipping of the mop into the same, and when the bail is brought up into an upright position for carrying the pail, bucket, or tub, its roller C is nearly in position for squeezing the mop, a little further pressing of the same over toward the stationary roller completing the wringing of the mop. The dotted lines in Fig. 2 indicate this upright position of the bail.

Fig. 4 shows the bail jointed at $f$, so that the upper part, B', may be turned down at the outside of the pail, bucket, or tub, if desired, and a stop, $g$, holds the bail in proper position when the same is used. This modification is necessary only when the utmost compactness is desired.

A foot-piece, $d$, may be applied to one side of the pail, bucket, or tub, especially if small, to hold it steady when wringing the mop.

What I claim as my invention, and desire to secure by Letters Patent, is—

In a mop-wringer, the movable roller C, mounted within the bail proper, B, between the handle and pivots thereof, substantially as and for the purpose herein specified.

The foregoing specification signed by me this 1st day of October, 1880.

JOHN K. O'NEIL.

Witnesses:
ALEXANDER FRIER,
M. J. STRAAB.